(12) United States Patent
Yu

(10) Patent No.: US 11,500,098 B2
(45) Date of Patent: Nov. 15, 2022

(54) TIME-OF-FLIGHT RANGING DEVICE AND TIME-OF-FLIGHT RANGING METHOD

(71) Applicant: GenOptics Precision Biotechnologies Inc., New Taipei (TW)

(72) Inventor: Teng-Chien Yu, Hsinchu (TW)

(73) Assignee: GenOptics Precision Biotechnologies Inc., New Taipei (TW)

( * ) Notice: Subject to any disclaimer, the term of this patent is extended or adjusted under 35 U.S.C. 154(b) by 611 days.

(21) Appl. No.: 16/574,063

(22) Filed: Sep. 17, 2019

(65) Prior Publication Data
US 2020/0132842 A1 Apr. 30, 2020

Related U.S. Application Data

(60) Provisional application No. 62/750,224, filed on Oct. 24, 2018.

(51) Int. Cl.
| | |
|---|---|
| *G01S 17/88* | (2006.01) |
| *G01S 7/4915* | (2020.01) |
| *G01S 7/4861* | (2020.01) |
| *G01S 7/4865* | (2020.01) |

(52) U.S. Cl.
CPC ............ *G01S 17/88* (2013.01); *G01S 7/4861* (2013.01); *G01S 7/4865* (2013.01); *G01S 7/4915* (2013.01)

(58) Field of Classification Search
CPC .... G01S 7/4861; G01S 7/4865; G01S 7/4915; G01S 17/88
See application file for complete search history.

(56) References Cited

U.S. PATENT DOCUMENTS

2010/0079683 A1* 4/2010 Kobori ................. H04N 9/3129
348/744

FOREIGN PATENT DOCUMENTS

JP 2012026853 A * 2/2012

* cited by examiner

*Primary Examiner* — Thanh Luu
(74) *Attorney, Agent, or Firm* — JCIPRNET

(57) ABSTRACT

A Time-of-Flight (ToF) ranging device and a ToF ranging method are provided. The ToF ranging device includes a signal processor, a light emitter, and a light sensor. The light emitter sequentially emits a plurality of intense pulsed lights to a sensing target. The light sensor sequentially receives the plurality of intense pulsed lights reflected by the sensing target to correspondingly output a plurality of pixel voltage signals. The signal processor generates a plurality of read-out voltage signals according to the plurality of pixel voltage signals. The signal processor compares the plurality of read-out voltage signals with a plurality of count signals to obtain a plurality of count values. The signal processor calculates an average value of the plurality of count values and determines a distance between the ToF ranging device and the sensing target according to the average value.

10 Claims, 3 Drawing Sheets

TIME-OF-FLIGHT RANGING DEVICE AND TIME-OF-FLIGHT RANGING METHOD

CROSS-REFERENCE TO RELATED APPLICATION

This application claims the priority benefit of U.S. provisional application Ser. No. 62/750,224, filed on Oct. 24, 2018. The entirety of the above-mentioned patent application is hereby incorporated by reference herein and made a part of this specification.

BACKGROUND OF THE INVENTION

1. Field of the Invention

The present invention generally relates to a ranging technology, in particular, to a Time-of-Flight (ToF) ranging device and a ToF ranging method.

2. Description of Related Art

With the evolution of ranging technologies, various ranging technologies have been continuously developed, and are widely used in, for example, vehicle distance detection, face recognition and various Internet of Things (IoT) apparatus. Common ranging technologies include, for example, an Infrared (IR) technology, an ultrasound ranging technology and an Intense Pulsed Light (IPL) ranging technology. However, with the increasing demand for the accuracy of ranging, the IPL ranging technology using a Time-of-Flight (ToF) measurement method is one of the main research directions in the field. In this regard, solutions to several embodiments will be described below in order to solve the problem of how to improve the accuracy of ToF ranging.

SUMMARY OF THE INVENTION

The present invention provides a Time-of-Flight (ToF) ranging device and a ToF ranging method, so as to provide an effect of accurately sensing a distance between the ToF ranging device and a sensing target.

The ToF ranging device of the present invention comprises a signal processor, a light emitter and a light sensor. The light emitter is coupled to the signal processor. The light emitter is configured to sequentially emit a plurality of Intense Pulsed Lights (IPLs) to the sensing target. The light sensor is coupled to the signal processor. The light sensor is configured to sequentially receive the plurality of IPLs reflected by the sensing target to correspondingly output a plurality of pixel voltage signals. The signal processor generates a plurality of read-out voltage signals according to the plurality of pixel voltage signals. The signal processor compares the plurality of read-out voltage signals with a plurality of count signals to obtain a plurality of count values. The signal processor calculates an average value of the plurality of count values. The signal processor determines a distance between the ToF ranging device and the sensing target according to the average value.

The ToF ranging method of the present invention is applicable to a ToF ranging device. The method comprises the following steps: sequentially emitting a plurality of IPLs to a sensing target by a light emitter; sequentially receiving the plurality of IPLs reflected by the sensing target by a light sensor to correspondingly output a plurality of pixel voltage signals; generating a plurality of read-out voltage signals by a signal processor according to the plurality of pixel voltage signals; comparing the plurality of read-out voltage signals with a plurality of count signals by the signal processor to obtain a plurality of count values; calculating an average value of the plurality of count values by a signal processor; and determining a distance between the ToF ranging device and the sensing target by the signal processor according to the average value.

Based on the above, the ToF ranging device and the ToF ranging method of the present invention are used to obtain the distance between the ToF ranging device and the sensing target through conversion by calculating the average value of the plurality of count values obtained by a plurality of sensings.

In order to make the aforementioned and other objectives and advantages of the present invention comprehensible, embodiments accompanied with figures are described in detail below.

DESCRIPTION OF THE EMBODIMENTS

Figure 1:
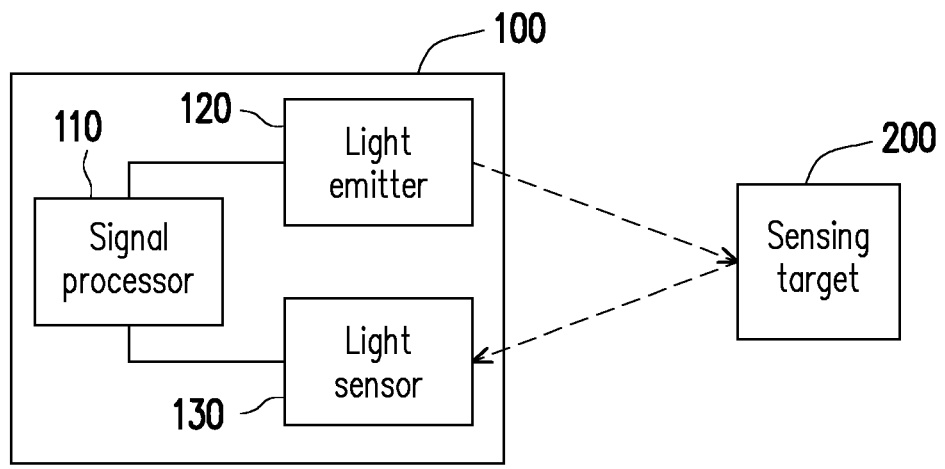
FIG. 1 is a functional block diagram of a Time-of-Flight (ToF) ranging device according to one embodiment of the present invention.

In order to make the content of the present invention more comprehensible, embodiments are described below as examples of implementation of the present invention. Wherever possible, the same reference numbers are used in the drawings and the description to refer to the same or like parts, components or steps.

FIG. 1 is a functional block diagram of a Time-of-Flight (ToF) ranging device according to one embodiment of the present invention. Referring to FIG. 1, the ToF ranging device 100 includes a signal processor 110, a light emitter 120 and a light sensor 130. The signal processor 110 is coupled to the light emitter 120 and the light sensor 130. In the present embodiment, the light emitter 120 is, for example, an Intense Pulsed Light (IPL) emitter or a laser diode. The light sensor 130 is, for example, a Complementary Metal Oxide Semiconductor (CMOS) Image Sensor (CIS). The light emitter 120 emits an IPL to the sensing target 200, and the light sensor 130 receives the IPL reflected by the sensing target 200.

In the present embodiment, the light emitter 120 sequentially emits a plurality of IPLs to the sensing target 200 in a very short time, and the light sensor 130 sequentially receives the plurality of IPLs reflected by the sensing target 200 to correspondingly output a plurality of pixel voltage signals. Therefore, the signal processor 110 generates a corresponding plurality of read-out voltage signals according to the plurality of pixel voltage signals. The signal processor 110 compares the plurality of read-out voltage signals with a plurality of count signals to obtain a plurality of count values. In the present embodiment, the signal processor 110 calculates an average_value of the plurality of count values, and determines a distance between the ToF ranging device 100 and the sensing target 200 according to the average_value.

For example, the signal processor 110 obtains an optical path length of the IPLs through conversion according to the average value of the plurality of count values, and one-half of the optical path length is the distance between the ToF ranging device 100 and the sensing target 200. In other words, the ToF ranging device 100 of the present embodiment performs sensing for a plurality of times in a very short time, and calculates the average_value of the plurality of sensing results to obtain a high-precision and high-accuracy count result. Therefore, the ToF ranging device 100 of the present embodiment provides a high-precision and high-accuracy ranging result.

Figure 2:
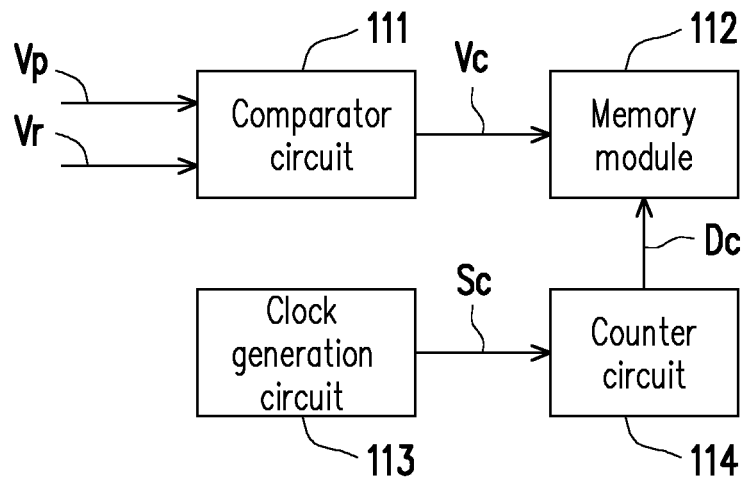
FIG. 2 is a functional block diagram of a signal processor according to one embodiment of the present invention.
Figure 3:
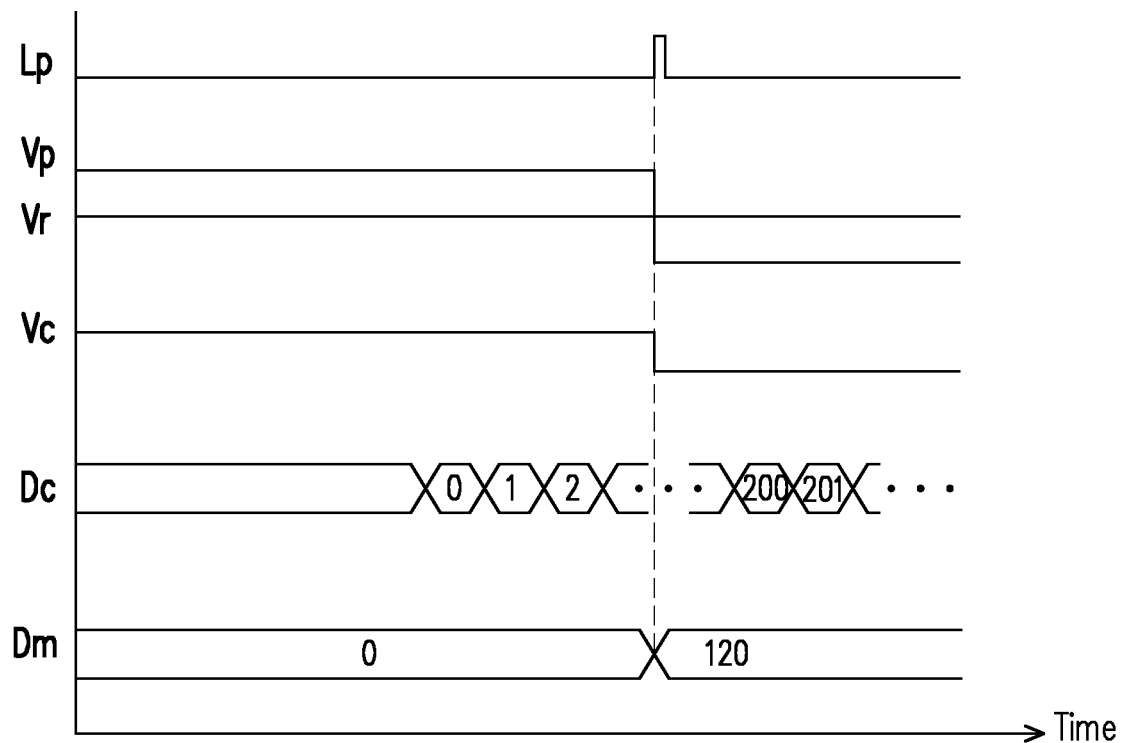
FIG. 3 is a signal sequence diagram according to the embodiment of FIG. 2 of the present invention.

FIG. 2 is a functional block diagram of a signal processor according to one embodiment of the present invention, and FIG. 3 is a signal sequence diagram according to the embodiment of FIG. 2 of the present invention. Referring to FIGS. 1 to 3, the signal processor 110 of the present embodiment includes, for example, a plurality of functional circuits as shown in FIG. 2. In the present embodiment, the signal processor 110 includes a comparator circuit 111, a memory module 112, a clock generation circuit 113 and a counter circuit 114. The comparator circuit 111 is coupled to the memory module 112. The clock generation circuit 113 is coupled to the counter circuit 114. The memory module 112 is coupled to the comparator circuit 111 and the counter circuit 114.

An operation mode to obtain one count value is described below. In the present embodiment, the comparator circuit 111 receives a pixel voltage Vp supplied by a pixel unit of the light sensor 130, and receives a reference signal Vr. The relation between the pixel voltage Vp and the reference signal Vr is as shown in FIG. 3. When the pixel unit of the light sensor 130 senses a pulse signal Lp of each IPL reflected by the sensing target 200, the pixel voltage Vp has a voltage change (falls down) from the rising edge of the pulse signal Lp, and when the pixel voltage Vp is interleaved with the reference signal Vr, the read-out voltage signal Vc correspondingly has a voltage change, namely the read-out voltage signal Vc has a falling edge. In the present embodiment, the clock generation circuit 113 supplies a clock signal Sc to the counter circuit 114 to cause the counter circuit 114 to generate a count signal Dc according to the clock signal Sc. The count signal Dc varying with time corresponds to different count values.

In the present embodiment, the memory module 112 includes, for example, a latch circuit, a comparison circuit and the like, and the present invention is not limited thereto. The memory module 112 receives the read-out voltage signal Vc and the count signal Dc. When the read-out voltage signal Vc has a falling edge, the memory module 112 reads out one of the plurality of count values corresponding to the count signal Dc. As shown in FIG. 3, memory data Dm of the memory module 112, for example, records a count value "120". It should be noted that in one embodiment, the clock generation circuit 113 generates the clock signal Sc according to, for example, a time-variant delay or a Spread Spectrum Clock (SSC), but the present invention is not limited thereto. In addition, FIG. 3 illustrates a waveform change relation of each signal varying with time, and the vertical axis of FIG. 3 does not indicate a specific voltage value.

Figure 4:
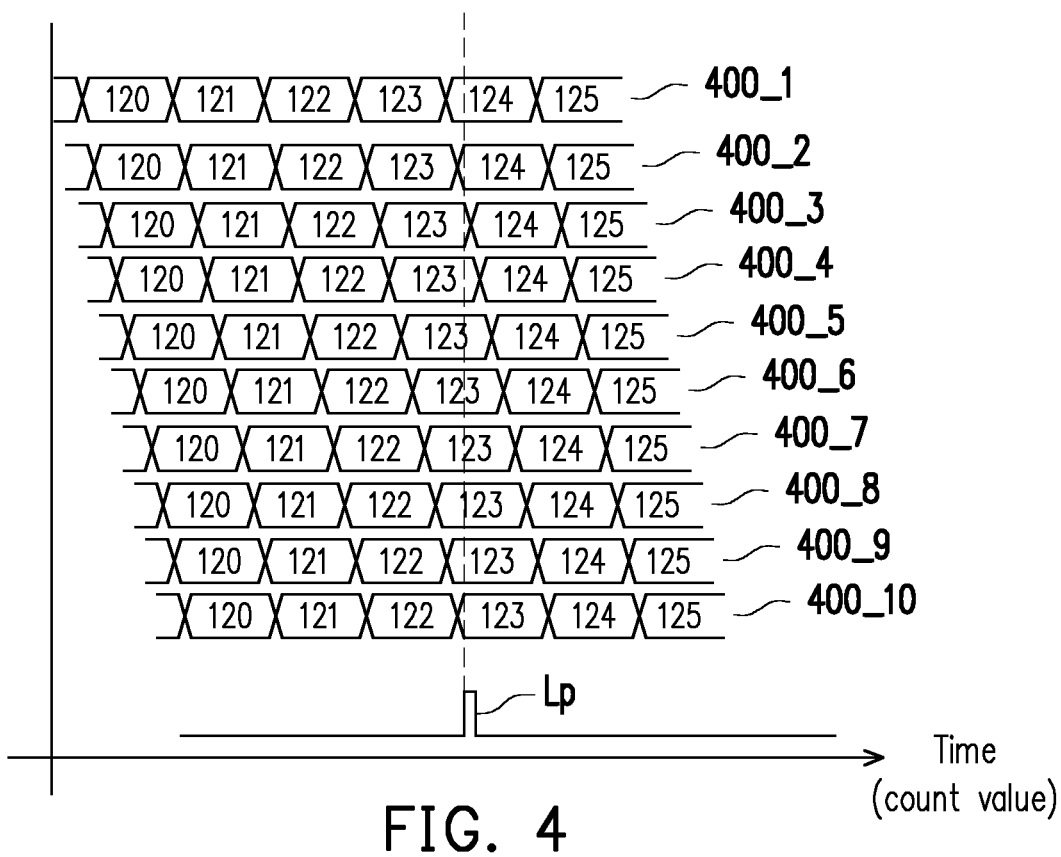
FIG. 4 is a schematic diagram illustrating a plurality of count values according to one embodiment of the present invention.

FIG. 4 is a schematic diagram illustrating a plurality of count values according to one embodiment of the present invention. Referring to FIGS. 1 and 4, an operation mode to obtain a plurality of count values is described below. In the present embodiment, the signal processor 110 includes a plurality of functional circuits as in the above FIG. 2, and performs the operation for obtaining the count values as in the above FIG. 3 for a plurality of times. In the present embodiment, since the light sensor 130 receives a plurality of IPLs reflected via the sensing target 200 in a very short time, each of the plurality of IPLs is regarded as the pulse signal Lp as shown in FIG. 4. In the present embodiment, the signal processor 110 reads out the corresponding count values according to the correspondence between the rising edges of the pulse signal Lp and a sequential plurality of count signals 400_1 to 400_10. In the present embodiment, the signal processor 110 generates the count signals 400_1 to 400_10 according to the time-variant delay, and thus the count signals 400_1 to 400_10 have the same high-resolution delay with each other.

As shown in FIG. 4, the signal processor 110 sequentially reads out, for example, "124", "124", "123", "123", "123", "123", "123", "123", "123", "123". The signal processor 110 calculates the sum of these count values as "1232" and calculates_an average_value as "123.2". Therefore, compared to a result obtained by only taking one count value, the ToF ranging device 100 of the present embodiment provides a high-precision and high-accuracy ranging result. It should be noted that the number of times of sensing (or times of count) of the ToF ranging device 100 of the present embodiment is not limited as shown in FIG. 4, and FIG. 4 is only an illustration of an exemplary embodiment. In addition, in one embodiment, the signal processor 110 also generates the count signals 400_1 to 400_10 according to the SSC to provide the high-precision and high-accuracy ranging result.

Figure 5:
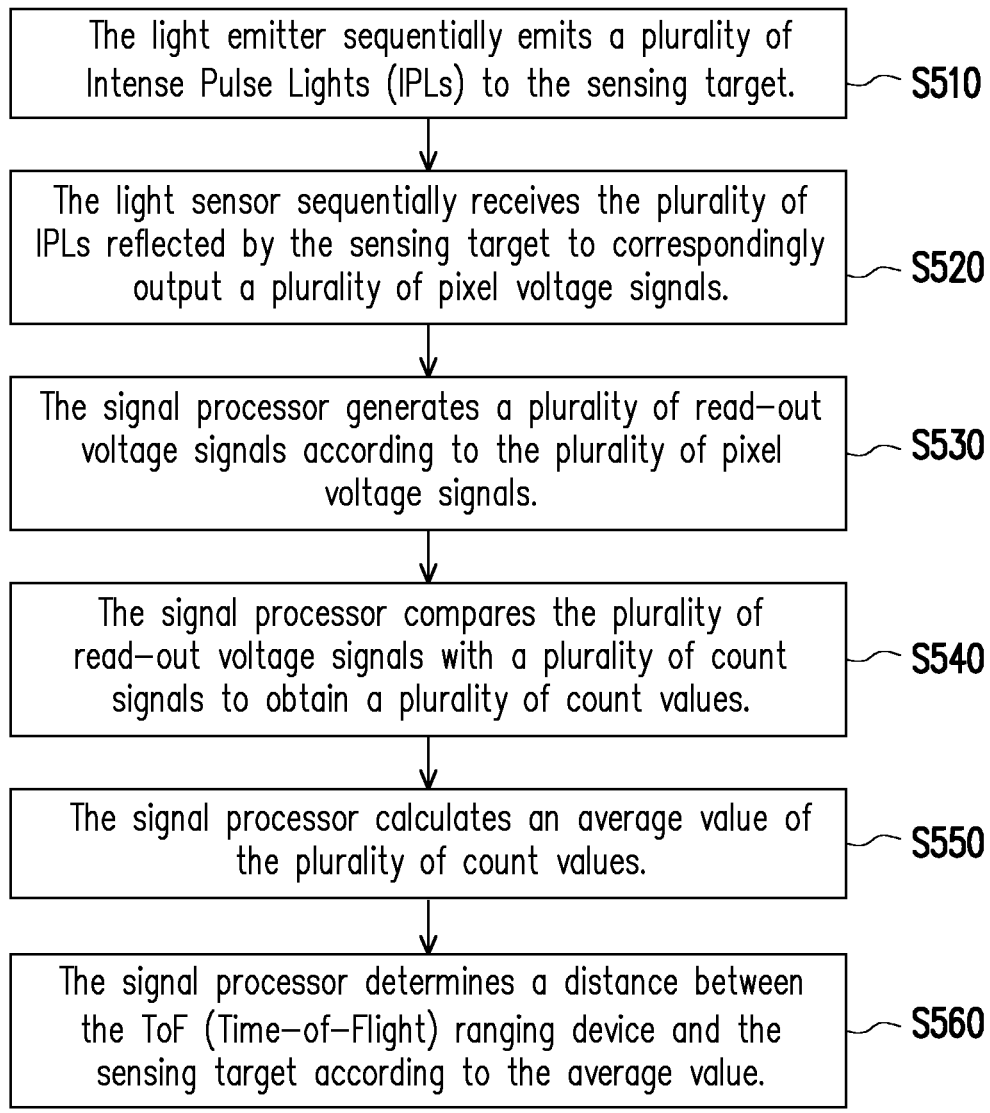
FIG. 5 is a flowchart of a Time-of-Flight (ToF) ranging method according to one embodiment of the present invention.

FIG. 5 is a flowchart of a Time-of-Flight (ToF) ranging method according to one embodiment of the present invention. Referring to FIGS. 1 and 5, the ToF ranging method of the present embodiment is applied at least to the ToF ranging device 100 of the embodiment of FIG. 1, so that the ToF ranging device 100 performs steps S510 to S560. In Step S510, a light emitter 120 sequentially emits a plurality of Intense Pulsed Lights (IPLs) to a sensing target 200. In Step S520, a light sensor 130 sequentially receives the plurality of IPLs reflected by the sensing target 200 to correspondingly output a plurality of pixel voltage signals to the signal processor. In Step S530, a signal processor 110 generates a plurality of read-out voltage signals according to the plurality of pixel voltage signals. In Step S540, the signal processor 110 compares the plurality of read-out voltage signals with a plurality of count signals to obtain a plurality of count values. In Step S550, the signal processor 110 calculates an average value_of the plurality of count values. In Step S560, the signal processor 110 determines a distance between the ToF ranging device 100 and the sensing target 200 according to the average value. Therefore, the ToF ranging method of the present embodiment effectively performs a ranging operation on the sensing target 200, and provides a high-precision and high-accuracy ranging result.

In addition, for other circuit features, implementation measures and technical details of the ToF ranging device 100 of the present embodiment, sufficient teachings, suggestions and implementation descriptions are obtained with reference to the above embodiments of FIGS. 1 to 4, and descriptions thereof are omitted here.

Based on the above, the ToF ranging device and the ToF ranging method of the present invention provide the high-precision and high-accuracy ranging result. Firstly, the ToF ranging device of the present invention emits the plurality of IPLs to the sensing target within a very short time through the light emitter, and retrieves the plurality of IPLs reflected by the sensing target through the light sensor, so as to generate the corresponding plurality of pixel voltage signals. Then, the ToF ranging device of the present invention generates the corresponding plurality of count values by use of the plurality of pixel voltage signals. Therefore, the ToF ranging device of the present invention obtains the high-precision and high-accuracy distance value through corresponding conversion via calculating the average value of the plurality of count values.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A Time-of-Flight (ToF) ranging device, comprising:
   a signal processor;
   a light emitter, coupled to the signal processor, and configured to sequentially emit a plurality of Intense Pulsed Lights (IPLs) to a sensing target; and
   a light sensor, coupled to the signal processor, and configured to sequentially receive the plurality of IPLs reflected by the sensing target to correspondingly output a plurality of pixel voltage signals,
   wherein the signal processor generates a plurality of read-out voltage signals according to the plurality of pixel voltage signals, and the signal processor compares the plurality of read-out voltage signals with a plurality of count signals to obtain a plurality of count values;
   wherein the signal processor calculates an average value of the plurality of count values, and the signal processor determines a distance between the ToF ranging device and the sensing target according to the average value;
   wherein the light sensor senses a plurality of pulse signals of the plurality of the IPLs to output the plurality of pixel voltage signals corresponding to the plurality of pulse signals; and
   wherein the signal processor comprises a comparator circuit, the comparator circuit compares each of the plurality of pixel voltage signals with a reference signal to output the plurality of read-out voltage signals.

2. The ToF ranging device according to claim 1, wherein the signal processor comprises a memory module, and the memory module reads out each corresponding count value in each corresponding count signal according to a falling edge of each of the plurality of read-out voltage signals.

3. The ToF ranging device according to claim 1, wherein the signal processor comprises a clock generation circuit and a counter circuit, and the clock generation circuit is configured to provide a plurality of clock signals to cause the counter circuit to generate the plurality of count signals according to the plurality of clock signals.

4. The ToF ranging device according to claim 3, wherein the clock generation circuit generates the plurality of clock signals according to a time-variant delay.

5. The ToF ranging device according to claim 3, wherein the clock generation circuit generates the plurality of clock signals according to a Spread Spectrum Clock (SSC).

6. A Time-of-Flight (ToF) ranging method, applicable to a ToF ranging device, the method comprising:
   sequentially emitting a plurality of Intense Pulsed Lights (IPLs) to a sensing target by a light emitter;
   sequentially receiving the plurality of IPLs reflected by the sensing target by a light sensor to correspondingly output a plurality of pixel voltage signals, comprising:
      sensing a plurality of pulse signals of the plurality of IPLs by the light sensor to output the plurality of pixel voltage signals corresponding to the plurality of pulse signals;
   generating a plurality of read-out voltage signals by a signal processor according to the plurality of pixel voltage signals, comprising:
      comparing each of the plurality of pixel voltage signals with a reference signal by a comparator circuit to output the plurality of read-out voltage signals;
   comparing the plurality of read-out voltage signals with a plurality of count signals by the signal processor to obtain a plurality of count values;
   calculating an average value of the plurality of count values by the signal processor; and
   determining a distance between the ToF ranging device and the sensing target by the signal processor according to the average value.

7. The ToF ranging method according to claim 6, wherein the step of obtaining the plurality of count values comprises: reading out each corresponding count value in each corresponding count signal by a memory module according to a falling edge of each of the plurality of read-out voltage signals.

8. The ToF ranging method according to claim 6, further comprising: providing a plurality of clock signals by a clock generation circuit; and generating the plurality of count signals by a counter circuit according to the plurality of clock signals.

9. The ToF ranging method according to claim 8, wherein the clock generation circuit generates the plurality of clock signals according to a time-variant delay.

10. The ToF ranging method according to claim 8, wherein the clock generation circuit generates the plurality of clock signals according to a Spread Spectrum Clock (SSC).

* * * * *